(12) United States Patent
Sanchez et al.

(10) Patent No.: US 10,121,205 B1
(45) Date of Patent: *Nov. 6, 2018

(54) RISK EVALUATION BASED ON VEHICLE OPERATOR BEHAVIOR

(71) Applicant: STATE FARM MUTUAL AUTOMOBILE INSURANCE COMPANY, Bloomington, IL (US)

(72) Inventors: Kenneth J. Sanchez, Bloomington, IL (US); Aaron Scott Chan, Lisle, IL (US); Matthew R. Baker, Franklin, TN (US); Matthew Zettinger, Glen Ellyn, IL (US); John A. Nepomuceno, Bloomington, IL (US); Brian Mark Fields, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,265

(22) Filed: Jan. 8, 2015

Related U.S. Application Data

(63) Continuation of application No. 13/897,650, filed on May 20, 2013, now Pat. No. 8,954,340.

(60) Provisional application No. 61/793,939, filed on Mar. 15, 2013.

(51) Int. Cl.
*G06Q 40/08* (2012.01)

(52) U.S. Cl.
CPC .................................. *G06Q 40/08* (2013.01)

(58) Field of Classification Search
None
See application file for complete search history.

(56) References Cited

U.S. PATENT DOCUMENTS

| | | | | |
|---|---|---|---|---|
| 6,064,970 A | * | 5/2000 | McMillan | G06Q 30/0283 705/4 |
| 6,925,425 B2 | * | 8/2005 | Remboski | G07C 5/0808 340/540 |

(Continued)

FOREIGN PATENT DOCUMENTS

| | | |
|---|---|---|
| WO | WO-00/07150 A1 | 2/2000 |

OTHER PUBLICATIONS

Anonymous; "GreenRoad Allowing Data Integration with Third Party Systems", Penton Business Media, Inc. and Penton Media Inc., Sep. 15, 2011.

(Continued)

*Primary Examiner* — Robert R Niquette
(74) *Attorney, Agent, or Firm* — Marshall, Gerstein & Borun LLP; Randall G. Rueth

(57) ABSTRACT

A method includes retrieving data about vehicle operator behavior via a computer network, wherein the data about vehicle operator behavior is generated by a motion sensing device adapted to monitor movements of a vehicle operator, and clustering the data about vehicle operator behavior into a plurality of groups of data. The method further includes determining a numerical level of risk corresponding to each of the plurality of groups of data and generating an insurance rate for an insurance product, wherein the insurance rate is consistent with the numerical levels of risk corresponding to each of the plurality of groups of data.

16 Claims, 4 Drawing Sheets

(56) References Cited

U.S. PATENT DOCUMENTS

| | | | | |
|---|---|---|---|---|
| 6,931,309 | B2* | 8/2005 | Phelan | G01M 17/00 |
| | | | | 340/439 |
| 6,974,414 | B2* | 12/2005 | Victor | A61B 3/113 |
| | | | | 340/576 |
| 8,738,523 | B1 | 5/2014 | Sanchez et al. | |
| 8,954,340 | B2 | 2/2015 | Sanchez et al. | |
| 2008/0243558 | A1* | 10/2008 | Gupte | G06O 40/08 |
| | | | | 705/4 |
| 2009/0024419 | A1 | 1/2009 | McClellan et al. | |
| 2009/0210257 | A1* | 8/2009 | Chalfant | G06Q 40/08 |
| | | | | 705/4 |
| 2010/0131300 | A1 | 5/2010 | Collopy et al. | |
| 2010/0205012 | A1* | 8/2010 | McClellan | G06Q 40/08 |
| | | | | 705/4 |
| 2012/0303392 | A1* | 11/2012 | Depura | H04W 52/0258 |
| | | | | 705/4 |
| 2013/0144657 | A1* | 6/2013 | Ricci | H04W 4/90 |
| | | | | 705/4 |
| 2013/0179198 | A1* | 7/2013 | Bowne | G06Q 10/0639 |
| | | | | 705/4 |
| 2013/0182079 | A1 | 7/2013 | Holz | |
| 2013/0182897 | A1 | 7/2013 | Holz | |
| 2013/0182902 | A1 | 7/2013 | Holz | |
| 2013/0204645 | A1 | 8/2013 | Lehman et al. | |
| 2013/0297418 | A1* | 11/2013 | Collopy | G06Q 30/0224 |
| | | | | 705/14.53 |
| 2014/0326081 | A1 | 11/2014 | Pierry | |

OTHER PUBLICATIONS

Kaneko et al., "Multiday Driving Patterns and Motor Carrier Accident Risk. A Disaggregate Analysis", Accident Analysis and Prevention, vol. 24, No. 5, pp. 437-456, Jan. 1, 1992.
Notice of Allowance in U.S. Appl. No. 13/897,646 dated Jan. 17, 2014.
Notice of Allowance in U.S. Appl. No. 13/897,650 dated Oct. 1, 2014.
Office Action in U.S. Appl. No. 13/897,646 dated Oct. 30, 2013.
Office Action in U.S. Appl. No. 13/897,650 dated Apr. 16, 2014.
Office Action in U.S. Appl. No. 13/897,650 dated Aug. 14, 2014.
Office Action in U.S. Appl. No. 13/897,650 dated Jan. 8, 2014.
Office Action in U.S. Appl. No. 13/897,650 dated Sep. 20, 2013.
Office Action in U.S. Appl. No. 14/592,277 dated Feb. 6, 2015.
York, Jim, "Identifying High-Risk Drivers", Fleet Owner, Jul. 2011.
Office Action in U.S. Appl. No. 14/592,277 dated May 15, 2015.
Office Action in U.S. Appl. No. 14/268,369 dated Jun. 4, 2015.
Office Action in U.S. Appl. No. 14/268,369 dated Sep. 25, 2015.
Office Action in U.S. Appl. No. 14/592,277 dated Sep. 1, 2015.
Office Action in U.S. Appl. No. 14/268,369 dated Oct. 6, 2016.
Office Action in U.S. Appl. No. 14/268,369 dated Feb. 23, 2016.
Office Action in U.S. Appl. No. 14/592,277 dated Apr. 13, 2017.
Office Action in U.S. Appl. No. 14/268,369 dated Jun. 20, 2016.
Office Action in U.S. Appl. No. 14/268,369 dated Feb. 24, 2017.
Office Action in U.S. Appl. No. 14/268,369 dated Jun. 16, 2017.
Office Action in U.S. Appl. No. 14/592,277 dated Aug. 25, 2017.
Office Action in U.S. Appl. No. 14/268,369 dated Nov. 2, 2017.

* cited by examiner

RISK EVALUATION BASED ON VEHICLE OPERATOR BEHAVIOR

RELATED APPLICATIONS

This application is a continuation application of U.S. application Ser. No. 13/897,650, filed May 20, 2013, the disclosure of which is hereby incorporated herein by reference in its entirety for all purposes.

TECHNICAL FIELD

The present disclosure generally relates to determining the risk associated with a vehicle operator and, more particularly, to a method for gathering and analyzing risk related data.

BACKGROUND

A common automotive insurance practice is to rate vehicles with primary, secondary, etc. drivers to generate an appropriate insurance rate for a vehicle. To this end, insurance agents collect driver information from customers and determine levels of risk associated with the drivers of the vehicle. For example, a level of risk associated with a driver is commonly based on age, gender, driving history, etc.

However, information provided by insurance customers may not accurately identify drivers of a vehicle, much less the level of risk associated with those drivers. For example, insurance providers do not have easy access to information indicating who is driving the vehicle at specific times, how drivers of the vehicle perform under certain conditions (snow, rain, night, etc.), where the vehicle is driven, how drivers cognitively process important information while driving, etc.

SUMMARY

In one embodiment, a method comprises retrieving data about vehicle operator behavior via a computer network, wherein the data about vehicle operator behavior is generated by a motion sensing device adapted to monitor movements of a vehicle operator, and clustering, by one or more processors specifically configured by a first routine, the data about vehicle operator behavior into a plurality of groups of data, each of the plurality of groups of data representing a type of movement of the vehicle operator. The method further includes determining, by the one or more processors, a numerical level of risk corresponding to each of the plurality of groups of data by executing a learning routine, wherein the learning routine is specifically trained to determine the numerical level of risk based on learned correlations between detected movements of vehicle operators and levels of risk, and wherein the learning routine is trained by executing the learning routine with a set of training data about past vehicle operator movements, and generating, by the one or more processors, an insurance rate for an insurance product, wherein the insurance rate is consistent with the numerical levels of risk corresponding to each of the plurality of groups of data.

In another embodiment, a computer device comprises a retrieval mechanism to gather motion sensing data from a motion sensing module, the motion sensing module adapted to monitor movements of a vehicle operator inside of a vehicle, and the motion sensing data indicative of the monitored movements of the vehicle operator, and a server application specially configuring one or more processors. When executed by the one or more processors, the server application causes the computer device to retrieve the motion sensing data from the motion sensing module via the retrieval mechanism, and cluster the motion sensing data into a plurality of groups of data, each of the plurality of groups of data representing a type of movement of the vehicle operator. The server application also causes the computer device to determine a numerical level of risk corresponding to each of the plurality of groups of data with a learning routine, wherein the learning routine is specifically trained to determine the numerical level of risk based on learned correlations between detected movements of vehicle operators and levels of risk, and wherein the learning routine is trained by executing the learning routine with a set of training data about past vehicle operator movements, and generate an insurance rate for an insurance product, wherein the insurance rate is consistent with the numerical levels of risk corresponding to each of the plurality of groups of data.

In yet another embodiment, a system comprises a motion sensing module disposed in a vehicle and configured to monitor movements of a vehicle operator inside of the vehicle, and generate motion sensing data indicative of the monitored movements of the vehicle operator. The system also includes an interface disposed in the vehicle, the interface connecting the motion sensing module to a computing device disposed at a location different from the location of the vehicle, and the computing device. The computing device is specially configured to retrieve the motion sensing data from the motion sensing module via the interface, and cluster the motion sensing data into a plurality of groups of data, each of the plurality of groups of data representing a type of movement of the vehicle operator. The computer device is further configured to determine a numerical level of risk corresponding to each of the plurality of groups of data with a learning routine, wherein the learning routine is specifically trained to determine the numerical level of risk based on learned correlations between detected movements of vehicle operators and levels of risk, and wherein the learning routine is trained by executing the learning routine with a set of training data about past vehicle operator movements, and generate an insurance rate for an insurance product, wherein the insurance rate is consistent with the numerical levels of risk corresponding to each of the plurality of groups of data.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein, the term "impairment" refers to any of a number of conditions that may reduce vehicle operator performance. A vehicle operator may be impaired if the vehicle operator is drowsy, asleep, distracted, intoxicated, ill, injured, suffering from a sudden onset of a medical condition, etc. Additionally, as used herein, the term "vehicle" may refer to any of a number of motorized transportation devices. A vehicle may be a car, truck, bus, train, boat, plane, etc. Additionally, as used herein, the term "driver" may refer to any operator of a vehicle. A driver may be a car driver, truck driver, bus driver, train engineer, captain of a boat, pilot of a plane, etc.

Figure 1:
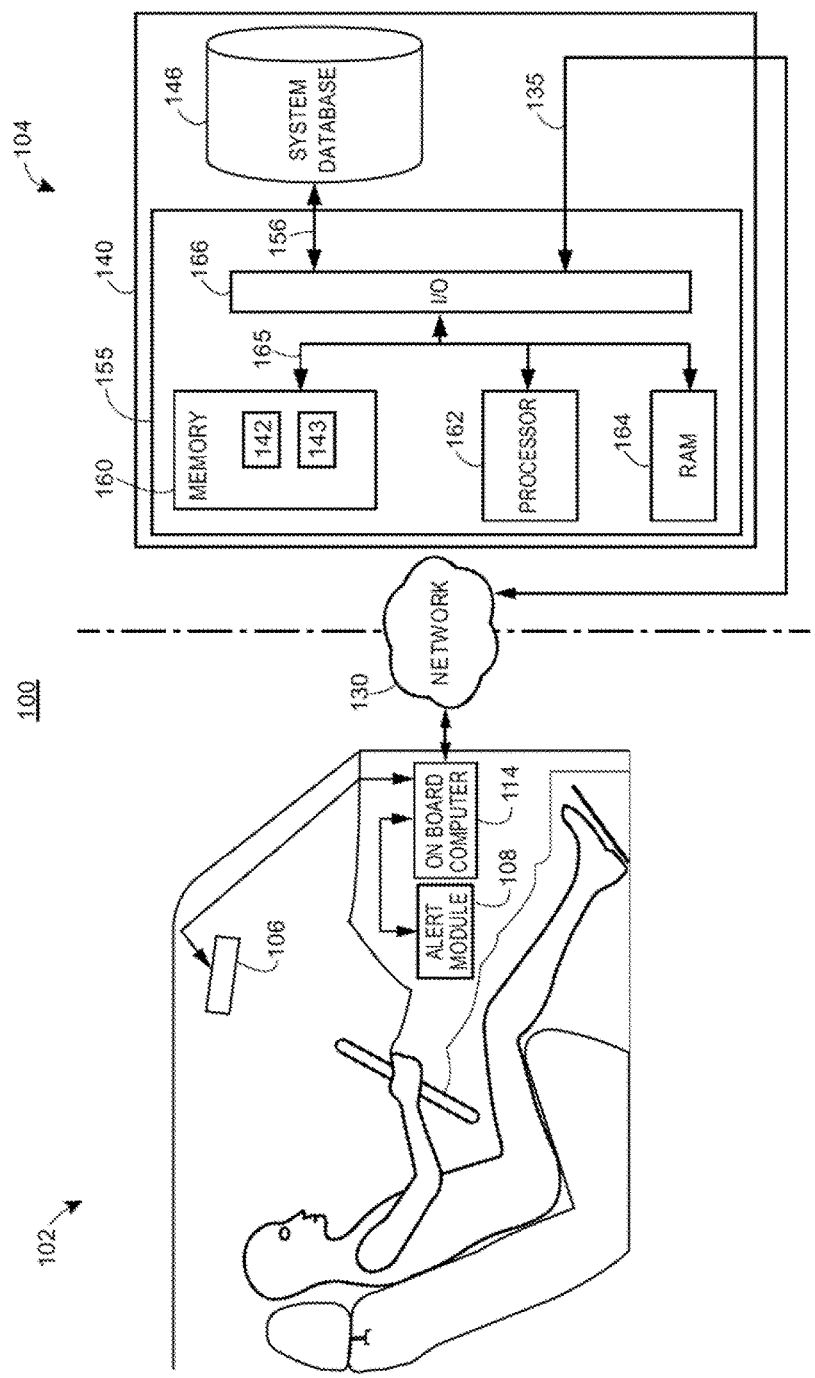
FIG. 1 illustrates an example system for gathering and analyzing motion sensing data associated with a vehicle operator.

FIG. 1 illustrates an example risk assessment system 100 for ascertaining the risk associated with a driver, or operator, of a vehicle. The high-level architecture includes both hardware and software applications, as well as various data communications channels for communicating data between the various hardware and software components. The risk assessment system 100 may be roughly divided into front-end components 102 and back-end components 104. The front-end components 102 may be mobile components disposed in the vehicle (e.g. car, truck, boat, etc.), and the back-end components 104 may be stationary components, in an embodiment.

The front end components 102 include a motion sensing module 106 and a driver alert module 108. Additionally, the front end components 102 may include an on-board computer 114, in an embodiment. The on-board computer 114 may be permanently installed in the vehicle (not shown) and may interface with various sensors in the vehicle (e.g., a braking sensor, a speedometer, a tachometer, etc.) or in the motion sensing module 106 and/or may interface with various external output devices in the vehicle such as the driver alert module 108, one or more speakers (not shown), one or more displays (not shown), etc.

The motion sensing module 106 may include any suitable sensors and/or processing devices adapted to detect the movement of objects in three dimensions (3D). For example, the motion detection module 106 may include range cameras, infrared projectors, complementary metal-oxide-semiconductor (CMOS) sensors, charge-couple device (CCD) sensors, depth sensors, light emitting diodes (LED), multi-array microphones, microchips, processors, computer executable instructions stored on one or more memories, etc. The motion detection module may include a Leap Motion™ Controller, Primesense™ 3D Sensor, or SoftKinetic DepthSense® imager, for example. In an embodiment, the motion sensing module 106, the on-board computer 114, or any other suitable computing device or server may execute software instructions, algorithms, etc. on one or more processors to control sensors in the motion sensing module 106. Further, the motion sensing module 106, the on-board computer 114, or any other suitable computing device or server may process data from the sensors to detect and track movement of objects in 3D, in an embodiment.

The front-end components 102 communicate with the back-end components 104 via the network 130. The network 130 may be a proprietary network, a secure public internet, a virtual private network or some other type of network, such as dedicated access lines, plain ordinary telephone lines, satellite links, combinations of these, etc. Where the network 130 comprises the Internet, data communications may take place over the network 130 via an Internet communication protocol.

The back-end components 104 include a server 140 with one or more computer processors adapted and configured to execute various software applications and components of the risk assessment system 100, in addition to other software applications. The server 140 further includes a database 146. The database 146 is adapted to store data related to the operation of the risk assessment system 100. Such data might include, for example, data collected by the front-end components 102 pertaining to the risk assessment system 100 and uploaded to the server 140. The server 140 may access data stored in the database 146 when executing various functions and tasks associated with the operation of the risk assessment system 100.

Although the risk assessment system 100 is shown to include one server 140, one motion sensing module 106, and one on-board computer 114, it should be understood that different numbers of servers, motion sensing modules, and on-board computers may be utilized. For example, the system 100 may include a plurality of servers and a plurality of motion sensing modules, all of which may be interconnected via the network 130. Further, the motion sensing module 106 may perform the various functions described herein in conjunction with the on-board computer 114 or alone (in such cases, the on-board computer 114 need not be present). Likewise, the on-board computer 114 may perform the various functions described herein in conjunction with the motion sensing module 106 or alone (in such cases, the motion sensing module 106 need not be present).

Furthermore, the processing performed by the one or more servers 140 may be distributed among a plurality of servers 140 in an arrangement known as "cloud computing," in an embodiment. This configuration may provide several advantages, such as, for example, enabling near real-time uploads and downloads of information as well as periodic uploads and downloads of information. Alternatively, the risk assessment system 100 may include only the front-end components 102. For example, the on-board computer 114 may perform all of the processing associated with gathering motion sensing data, clustering driver behaviors, assessing risk associated with drivers, and/or alerting or otherwise communicating with the vehicle operator. As such, the risk assessment system 100 may be a "stand-alone" system, neither sending nor receiving information over the network 130.

The server 140 may have a controller 155 that is operatively connected to the database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. The program memory 160 may be configured to store computer-readable instructions that when executed by the processor 162 cause the server 140 to implement a server application 142 and a web server 143. The instructions for the server application 142 may cause the server 140 to implement the methods described herein. While shown as a single block in FIG. 1, it will be appreciated that the server application 142 may include a number of different programs, modules, routines, and sub-routines that may collectively cause the server 140 implement the server application 142. It should be appreciated that although only one microprocessor 162 is shown, the controller 155 may include multiple microprocessors 162. Similarly, the memory of the controller 155 may include multiple RAMs 164 and multiple program memories 160. Further, while the instructions for the server application 142 and web server 143 are shown being stored in the program memory 160, the instructions may additionally or alternatively be stored in the database 146 and/or RAM 164. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 130 via a link 135.

Figure 2:
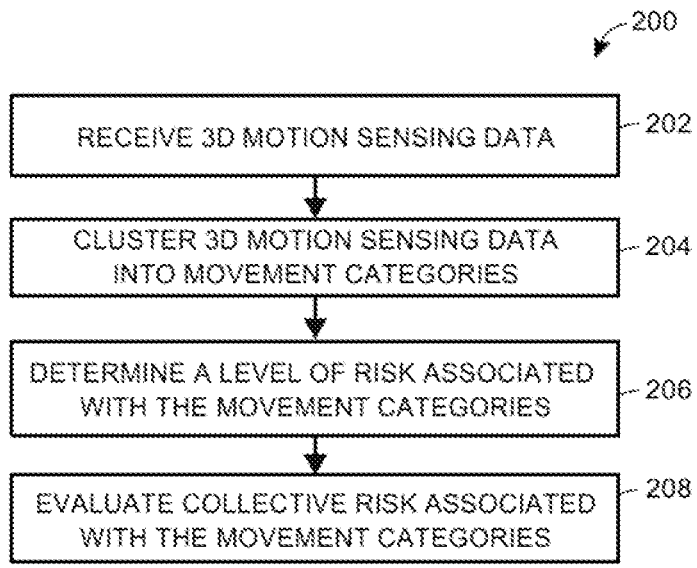
FIG. 2 is a flow diagram of an example method for ascertaining the risk associated with a driver which can be implemented in the system illustrated in FIG. 1.

FIG. 2 is a flow diagram of an example method 200 for ascertaining the risk associated with a driver based on 3D motion sensing data, provided the driver consents to such an application of the data. The method 200 may be implemented in the risk assessment system 100, for example. Elements of risk assessment system 100 will be referred to for ease of discussion, but it is understood that any suitable risk assessment system may implement method 200.

In an embodiment, the server 140 receives 3D motion sensing data via the network 130 (block 202). The motion sensing data may be un-processed (i.e. raw) data from sensors in the motion sensing module 106, processed or manipulated data from sensors in the motion sensing module 106, indications of particular motions, gestures, or other movements, etc., for example.

In some implementations, the motion sensing module 106, the on-board computer 114, or the server 140 may "pre-process" motion sensing data to identify certain motions, gestures, movements, etc. For example, upon receiving the motion sensing data, the server 140 may execute a software program stored in memory 160 to analyze raw motion sensing data and produce indications of certain motions (e.g. driver hands moving up and down, rotations of the driver head, etc.). A software program, executed on the server 140 or on-board computer 114, may locate and track driver hands, separate driver features from background features, track joint movements (e.g. with skeleton joint tracking), identify particular gestures, etc., for example.

The server 140 may then cluster 3D motion sensing data into categories corresponding to certain types of movement, i.e. movement categories (block 204). For example, the server 140 may cluster motion sensing data into categories of similar detected movements. The driver may frequently move a right hand from an arm rest position to a stretched position, in an example scenario, and the server 140 may cluster all such motions into one movement category. The driver may also occasionally lower his/her head from an upright position to a lowered position for an extended period of time, and the server 140 may cluster all these head motions into a separate movement category, in the example scenario. Details of the clustering of motion sensing data are further discussed with reference to FIG. 3.

In some embodiments, the server 140 may then determine a level of risk associated with one or more of the movement categories (block 206). For example, the server 140 may compare the motions in a movement category with reference data or learned metrics to associate risk with the category. In the above-mentioned example scenario, the category of hand motions from an arm rest position to a stretched position may closely match reference data of car radio adjustment motions, and, therefore, the server 140 may associate such motions with radio adjustment. Based on the frequency of radio adjustments, the server 140 may define a low or high level of risk corresponding to the radio adjustment category.

On the other hand, a supervised or unsupervised machine learning technique, as known in the industry, may learn that the category of lowering head motions, in the above scenario, has a high correlation to collisions (e.g. when a driver falls asleep at the wheel or looks away from the road). Therefore, the server 140 may define a high level of risk corresponding to the lowering head motion category. Further details of learning routines are discussed in reference to FIG. 4.

The server 140 may collectively analyze the levels of risk associated with a plurality of movement categories and develop a collective risk level, or index, associated with a driver (block 208), in some embodiments. The collective risk level may be a risk index (RI), risk score, risk grade, etc. and may be used for insurance rating purposes such as described in U.S. application Ser. No.13/897,646 entitled "Systems and Methods to Identify and Profile a Vehicle Operator" and filed on May 20, 2013, the entire disclosure of which is hereby incorporated by reference herein.

The development of a collective risk level, may include executing an algorithm that attempts to optimally combine the data in the movement categories, in an implementation. For example, the development of a collective risk level may include refactorizations of risk variables, iterative calculations of risk levels, etc. In one scenario, an evolutionary algorithm combined with a random forest algorithm, as known in the industry, may create combinations of movement category data and generate risk predictions based on the combinations, for example.

Figure 3:
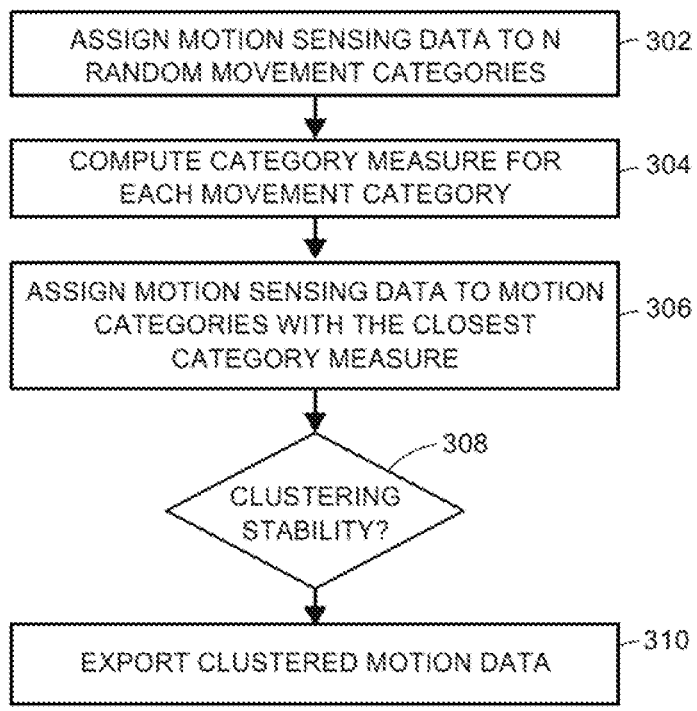
FIG. 3 is a flow diagram of an example method for clustering motion sensing data into movement categories which can be implemented in the system illustrated in FIG. 1.

FIG. 3 illustrates an example method 300 for clustering motion sensing data into movement categories. The risk assessment system 100 may implement method 300, for example, and the method 300 may be implemented as part of method 200 (e.g. at block 204). In some embodiments, suitable clustering methods known in the industry, such as hierarchical clustering, k-means clustering, distribution based clustering, density based clustering, subspace clustering, etc., may be used in addition to, in place of, or in combination with method 300.

The server 140 assigns motion sensing data to N random movement categories (block 302), where this initial assignment of the motion sensing data is random in that the assignment need not be a logical categorization. For example, motion sensing data gathered at a variety of times and representing a variety of movements may be divided and assigned to the N movement categories without an analysis of the similarity of specific movements in the movement categories. Although not required in example method 300, the server 140 may use pre-defined rules to assign motion sensing data to movement categories, in some embodiments.

The server 140 then calculates, or computes, a category measure associated with each of the N movement categories (block 304). In some embodiments, the category measure may be a within-cluster sum of squares measure, such as a measure used in k-means clustering, as known in the industry. For example, the within-cluster sum of squares measure may include a sum over 3D position coordinates, velocity coordinates, or acceleration coordinates.

Next, the server 140 re-assigns the motion sensing data such that portions of the data assigned to a movement category have measures proximate to the category measure of that movement category (block 306). For example, position coordinates corresponding to a certain movement may be compared with a plurality position coordinate within-cluster sum of squares measure.

The server 140 then tests the stability of the clustering of motion sensing data (block 308). For example, if the re-assignment of motion sensing data to N categories (at block 306) changes the categorization, or clustering, of the motion sensing data (e.g. from the initially assigned categories), the flow may revert to block 304 where category measures are re-calculated. However, if the clustering of motion sensing data becomes stable (e.g. within-cluster sum of squares measures are sufficiently minimized), the flow continues to block 310 where the clustered motion sensing data is exported, in an embodiment.

In some implementations, the clustering of motion sensing data does not require pre-programmed movement categories or even a specific number of movement categories. For example, the clustering of motion sensing data may employ a clustering algorithm that defines new movement categories as new motions, or behaviors, are encountered. A clustering algorithm may have defined categories for movements associated with adjusting the radio, talking on the phone, turning right or left, and honking a car horn, but upon encountering a new set of motion sensing data indicating a new behavior, such as eating an ice cream cone while driving, the clustering algorithm may define a new movement category, for example.

Figure 4:
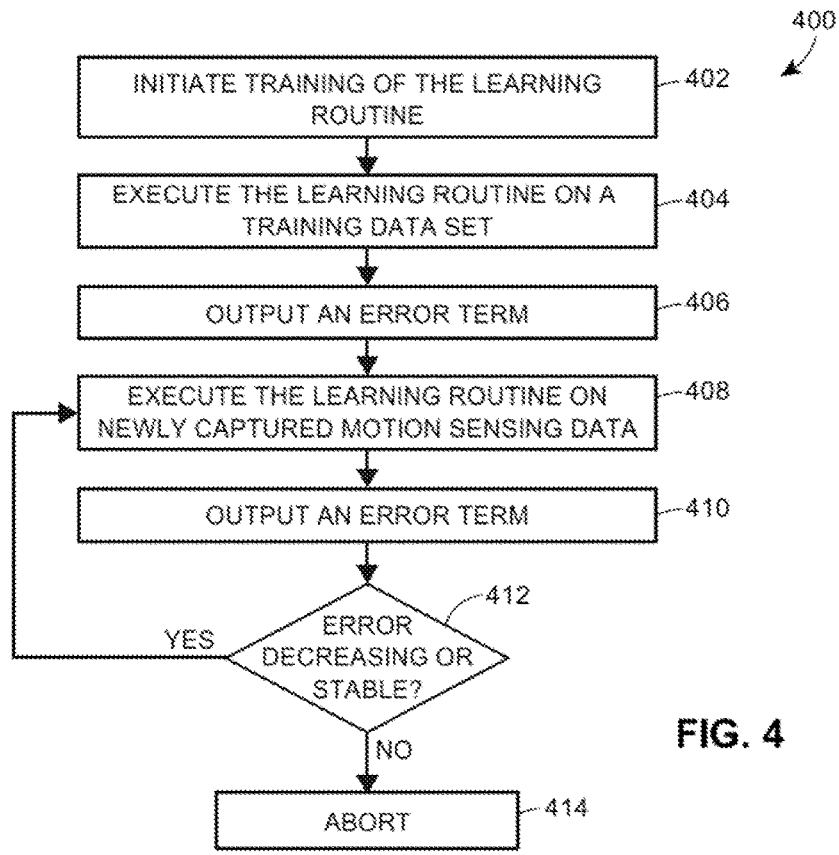
FIG. 4 is a flow diagram of an example method for training a learning routine to associate risk with movement categories which can be implemented in the system illustrated in FIG. 1.

FIG. 4 is a flow diagram of an example method 400 for training a learning routine to associate risk with movement categories. The risk assessment system 100 may implement method 400, for example, and the method 400 may be implemented as part of method 200 or in combination with method 200.

The server 140 may initiate the training of a learning routine to associate risk with movement categories (block 402). In some embodiments, the learning routine may be any suitable machine learning routine, as known in the industry, adapted to associate levels of risk with movement categories. For example, the learning routine may be a supervised learning routine in which human experts label training examples, or the learning routine may be an unsupervised learning routine in which risk levels are identified without human interaction.

Upon initiation, the server 140 may execute the learning routine on a set of training data (block 404). For example, the training data may be accumulated motion sensing data with known levels of risk, where the known levels of risk are defined by human experts. In an embodiment, the learning routine attempts to associate appropriate levels of risk with one or more movement categories in the motion sensing data. For example, the learning routine may associate a number between one and ten with each movement category, where one represents very low risk movements and ten represents very high risk movements. In some embodiments, the clustering of motion sensing data into movement groups and the association of risk with the movement categories may be combined into one learning routine.

Next, the server 140 may compare the levels of risk generated by the learning routine with known levels of risk to generate an error term (block 406). For example, the error term may be a difference between the levels of risk generated by the training routine executed on the training data set and the known levels of risk associated with the training data set. In one simplistic scenario, the learning routine may assign a level of risk of five (on a scale of one to ten) to a movement category corresponding to motions of eating while driving may, for example, while the known level of risk associated with the category is nine. In such a scenario, the error term may be an absolute value of four.

The server 140 then executes the learning routine on additional motion sensing data (block 408). The additional motion sensing data may be newly accumulated motion sensing data from the front-end components 102 or additional training data with known risk levels, for example.

Once the learning routine has executed on the additional data, the server 140 calculates a new error term based on the new results of the learning routine (block 410). Additionally, the server 140 evaluates the new error term with respect to the old error term to identify if the error term has increased or decreased (block 412). If the error term has decreased the flow reverts to block 408 where the server 140 may train the learning routine with additional data. If the error term is determined to be stable or increasing, the flow continues to 414 where the training of the learning routine ends. The stability of the error term may indicate that the learning routine is sufficiently trained for associating risk levels with movement categories, whereas an increasing error term may indicate that the learning routine is not able to be trained for associating risk levels with movement categories, for example.

Figure 5:
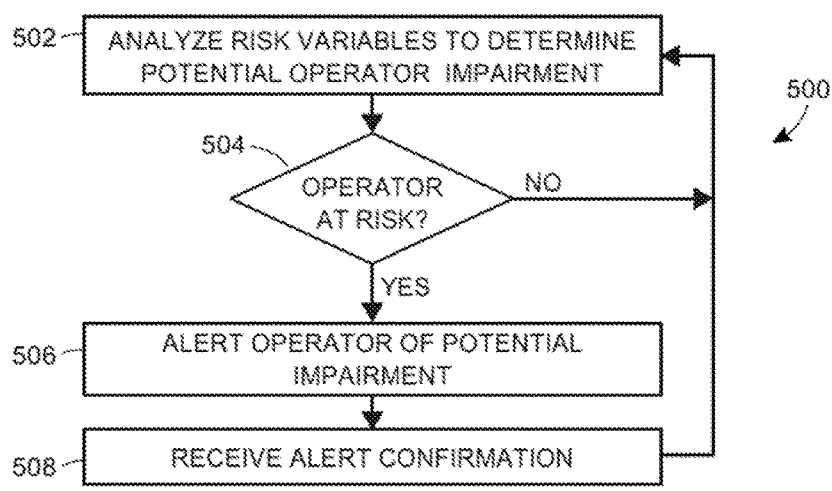
FIG. 5 is a flow diagram of an example method for alerting potentially impaired vehicle operators which can be implemented in the system illustrated in FIG. 1.

FIG. 5 is a flow diagram of an example method 500 for alerting drivers of possible impairment based on an analysis of motion sensing data. The method 500 may be implemented in the risk assessment system 100, for example.

Motion sensing data, such as the motion sensing data discussed in reference to FIG. 2, is analyzed to determine possible vehicle operator impairment (block 502). The analysis to determine vehicle operator impairment may be combined with the analysis to associate risk levels with movement categories (block 206 of FIG. 2), or the analysis to determine vehicle operator impairment may be performed independently, in an embodiment. For example, the server 140 may analyze the motion sensing data gathered from the front-end components 102 that may indicate vehicle operator impairment.

In an example scenario, the server 140 may analyze motion sensing data to identify vehicle operator behavior associated with the vehicle operator being drowsy, asleep, distracted, intoxicated, ill, etc. It may then be determined, based on the analysis of the motion sensing data, if the operator is likely to be impaired (block 504). If the vehicle operator is not likely to be impaired, the flow reverts to block 502 where further motion sensing data may be analyzed. In some embodiments, the analysis of motion sensing data for identifying operator impairment may be performed periodically or any time new motion sensing data (i.e. motion sensing data that have not yet been analyzed) is available.

Figure 6:
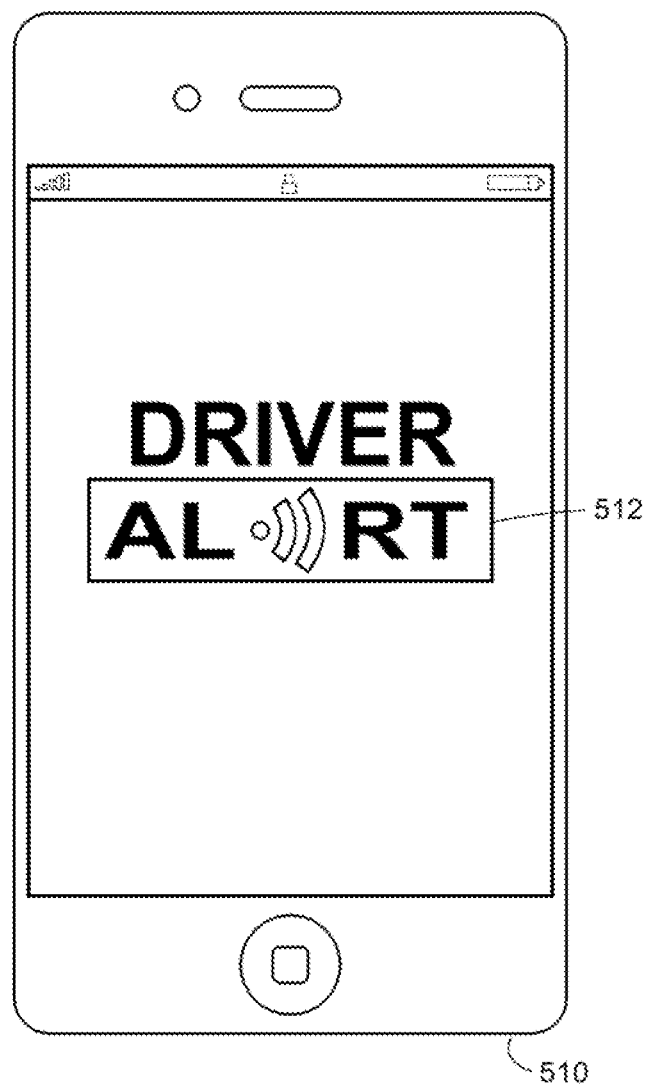
FIG. 6 illustrates an example alert displayed on a mobile device.

If the vehicle operator is likely to be impaired, the flow continues to block 506 where an alert may be sent to the vehicle operator via a driver alert module, such as the driver alert module 108 or one or more mobile devices registered to an insurance customer. The alert may be at least one or more of an audible alert, a visual alert, or a tactile alert. For example, a tactile alert system may cause a driver's seat to vibrate, or an audible alert system may cause a chime, claxon, siren, etc. and/or a custom recorded sound such as a sound clip or ringtone to be played through one or more speakers. In another example, an alert may include a mobile device alert including visual displays, sounds, and/or messages displayed on one or more of mobile device registered to an insurance customer. FIG. 6 illustrates an example mobile device alert including a visual alert display 512 on a mobile device 510.

In some implementations, a driver is alerted until an alert confirmation is received (block 508). For example, the server 140 may continuously or periodically alert the vehicle operator until the server 140 receives an alert confirmation from the vehicle operator. The vehicle operator may tap or click visual alert display 512 of the example mobile device alert to confirm receipt of the alert at which time a confirmation signal is communicated to the server 140 via the network 130, in an implementation.

We claim:

1. A method comprising:
 generating, in a motion sensing device disposed in a vehicle and adapted to monitor movements of a vehicle operator, sensor data;
 pre-processing, in an on-board computer of the vehicle, the sensor data to generate data about vehicle operator behavior, wherein pre-processing the sensor data includes identifying a plurality of types of movement of the vehicle operator;
 retrieving, by a computing device disposed at a location different from a location of the vehicle, the data about vehicle operator behavior from the vehicle via a computer network;
 clustering, by one or more processors of the computing device that are specifically configured by a first routine, the data about vehicle operator behavior into a plurality of groups of data, each of the plurality of groups of data representing a different one of the plurality of types of movement of the vehicle operator;
 determining, by the one or more processors, a numerical level of risk corresponding to each of the plurality of groups of data by executing a learning routine specifically configured to determine the numerical level of risk based on correlations between types of movement of vehicle operators and levels of risk;
 generating, by the one or more processors, an insurance rate for an insurance product, wherein the insurance rate is consistent with the numerical levels of risk corresponding to each of the plurality of groups of data; and
 communicating, via the computer network, insurance costs for the insurance product according to the generated insurance rate to an owner of the insurance product.

2. The method of claim 1, further comprising:
 analyzing, by the one or more processors, the data about vehicle operator behavior to identify recommendations to reduce risk; and
 electronically communicating the recommendations to reduce risk to the vehicle operator.

3. The method of claim 1, wherein the learning routine is trained by executing the learning routine with a set of training data about past vehicle operator movements.

4. The method of claim 1, wherein generating the insurance rate for an insurance product consistent with the numerical levels of risk corresponding to each of the plurality of groups of data includes generating a risk index corresponding to the vehicle operator, the risk index being a collective measure of risk based on the numerical levels of risk corresponding to the plurality of groups of data.

5. The method of claim 1, wherein clustering the data about vehicle operator behavior into the plurality of groups of data includes comparisons with pre-programmed movement categories and comparisons with newly created movement categories, the newly created movement categories being created for groups of data dissimilar to the pre-programmed movement categories.

6. The method of claim 1, wherein determining, with one or more processors, the numerical level of risk corresponding to each of the plurality of groups of data includes:
 determining, by executing the trained learning routine with one or more processors, whether at least some of the plurality of groups of data represent a type of behavior associated with relatively high risk in comparison to other types of behavior.

7. The method of claim 6, wherein determining whether the at least some of the plurality of groups of data represent the type of behavior associated with relatively high risk includes identifying the presence of a particular ones of the plurality of groups of data, wherein the presence of the particular ones of the plurality of groups of data within the whole of the data about vehicle operator behavior is associated with relatively high risk.

8. The method of claim 6, further comprising:
 when it is determined that the at least some of the plurality of groups of data represent the type of behavior associated with relatively high risk in comparison to the other types of behavior, alerting the vehicle operator using at least one or more of an audible alert, a visual alert, or a tactile alert.

9. The method of claim 1, further comprising:
 updating the training of the learning routine based on the retrieved data about vehicle operator behavior corresponding to the vehicle operator.

10. The method of claim 1, further comprising:
 in response to communicating the insurance costs, receiving, via the computer network, payment for the insurance product.

11. The method of claim 1, wherein communicating the insurance costs to the owner of the insurance product includes:
 generating, by the one or more processors, a risk report, the risk report including at least two of the numerical levels of risk, the generated insurance rate, the insurance costs according to the generated insurance rate, or payment instructions; and communicating, via the computer network, the risk report to the owner of the insurance product.

12. The method of claim 1, wherein the types of movement of the vehicle operator represented by the plurality of groups of data include two or more of:
   mobile device use;
   vehicle feature adjustments;
   eating or drinking;
   smoking;
   grooming and personal hygiene;
   reading a map or navigation device;
   reaching for objects inside the vehicle; or
   looking at objects or events outside the vehicle.

13. The method of claim 1, wherein the types of movement of the vehicle operator represented by the plurality of groups of data include three or more of:
   mobile device use;
   vehicle feature adjustments;
   eating or drinking;
   smoking;
   grooming and personal hygiene;
   reading a map or navigation device;
   reaching for objects inside the vehicle; or
   looking at objects or events outside the vehicle.

14. A system comprising:
   a motion sensing module disposed in a vehicle and configured to:
      monitor movements of a vehicle operator inside of the vehicle, and
      generate sensor data indicative of the monitored movements of the vehicle operator;
   an on-board computer of the vehicle configured to:
      pre-process the sensor data to generate data about vehicle operator behavior, at least by identifying a plurality of types of movement of the vehicle operator;
   an interface disposed in the vehicle, the interface connecting the on-board computer to a computing device disposed at a location different from a location of the vehicle; and
   the computing device, wherein the computing device is specially configured to:
      retrieve the data about vehicle operator behavior from the on-board computer via the interface,
      cluster the data about vehicle operator behavior into a plurality of groups of data, each of the plurality of groups of data representing a different one of the plurality of types of movement of the vehicle operator,
      determine a numerical level of risk corresponding to each of the plurality of groups of data by executing a learning routine specifically configured to determine the numerical level of risk based on correlations between types of movement of vehicle operators and levels of risk,
      generate an insurance rate for an insurance product, wherein the insurance rate is consistent with the numerical levels of risk corresponding to each of the plurality of groups of data, and
      communicate, via a computer network, insurance costs for the insurance product according to the generated insurance rate to an owner of the insurance product.

15. The system of claim 14, wherein the computer device is further configured to:
   analyze the data about vehicle operator behavior to identify recommendations to reduce risk, and
   electronically communicate the recommendations to reduce risk to the vehicle operator.

16. The system of claim 14, wherein clustering the motion sensing data into a plurality of groups of data includes utilizing the motion sensing data to at least one of locate and track hands of the vehicle operator, separate features of the vehicle operator from background features, track joint movements of the vehicle operator, or identify particular gestures of the vehicle operator.

* * * * *